Figure 4:
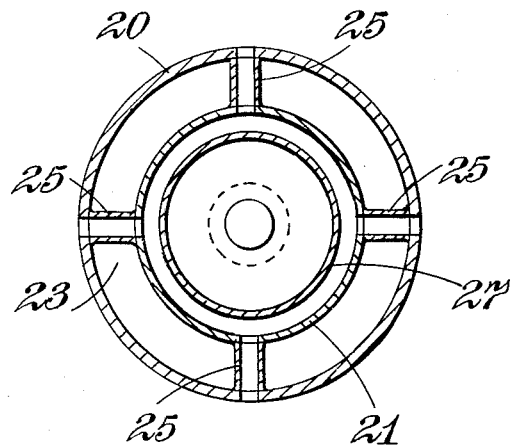

June 13, 1961 D. M. BROWN 2,987,879
JET PROPULSION NOZZLE WITH NOISE REDUCING MEANS
Filed Oct. 18, 1957 3 Sheets-Sheet 1
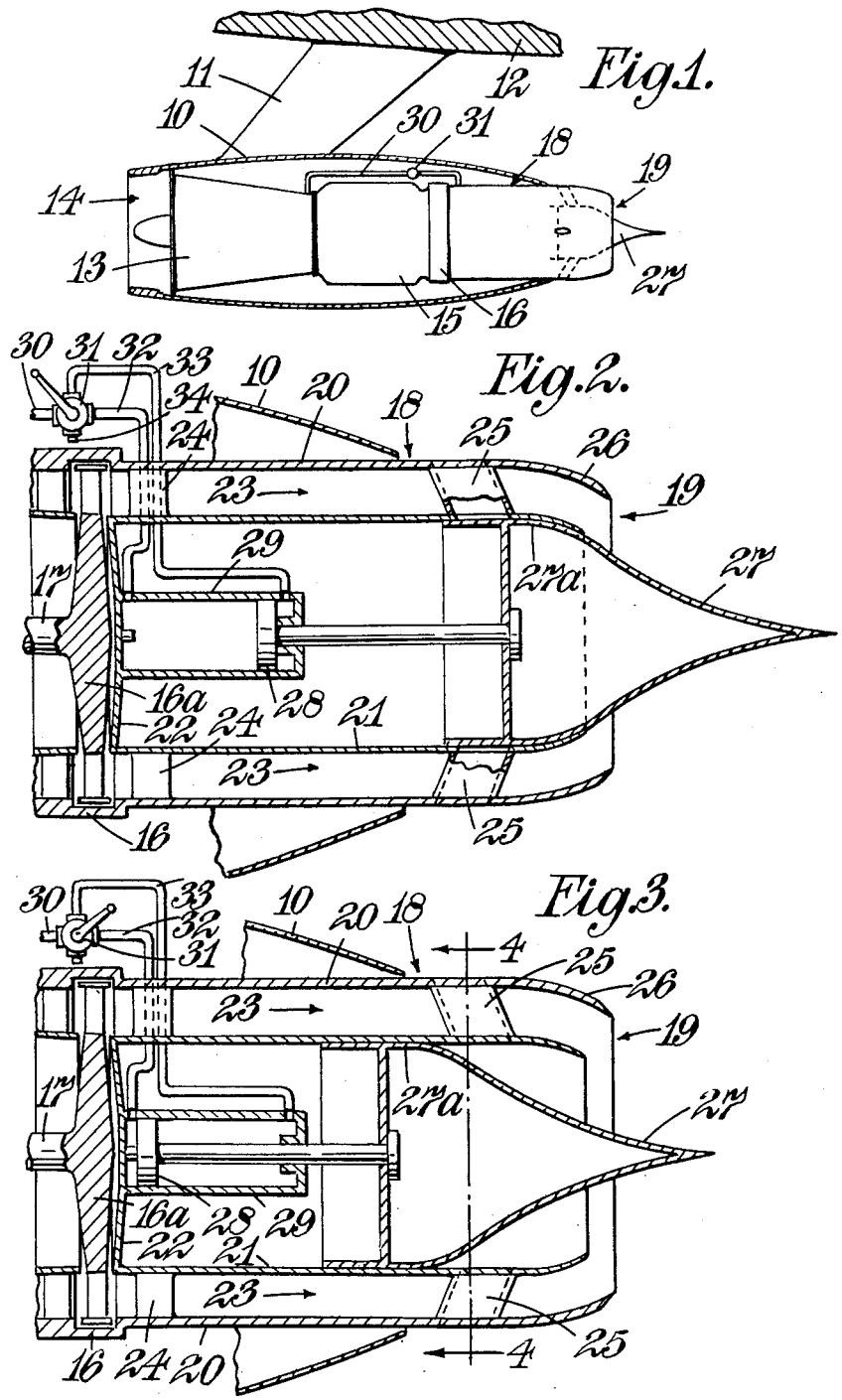

June 13, 1961 D. M. BROWN 2,987,879
JET PROPULSION NOZZLE WITH NOISE REDUCING MEANS
Filed Oct. 18, 1957 3 Sheets-Sheet 3

INVENTOR
DAVID M. BROWN
By
Mawhinney + Mawhinney
ATTORNEYS

United States Patent Office 2,987,879
Patented June 13, 1961

2,987,879
JET PROPULSION NOZZLE WITH NOISE REDUCING MEANS
David Morris Brown, Alvaston, England, assignor to Rolls-Royce Limited, Derby, England, a British company
Filed Oct. 18, 1957, Ser. No. 690,986
Claims priority, application Great Britain Oct. 23, 1956
8 Claims. (Cl. 60—35.6)

This invention comprises improvements in or relating to jet propulsion nozzles such as are employed for aircraft propulsion purposes and has for an object to provide a construction of jet-propulsion nozzle whereof the noise-level is reduced as compared with a conventional frusto conical nozzle.

According to the present invention, a jet propulsion nozzle is constructed so that the gas stream at the outlet of the nozzle is of annular form and so that, in some operating conditions at least, a supply of air is conducted to internally of the annular gas stream whereby substantial mixing of the gas stream and air progresses from both the internal and external surfaces of the annular gas stream.

It has been found that, with a jet nozzle as above set forth, the mixing of the air and gas issuing from the nozzle is accelerated and the intensity of noise produced in operation of the nozzle is thus reduced, particularly in the low frequency range of audible frequencies.

The supply of air to be conducted to internally of the annular gas stream may conveniently be obtained from externally of the nozzle.

According to a preferred arrangement of this invention the nozzle comprises an outer wall and a centre body within the outer wall and having a downstream portion projecting beyond the downstream end of the outer wall, whereby an annular outlet is formed between the outer wall and the centre body, the downstream portion of the centre body being shaped to reduce the aerodynamic drag of the nozzle and the downstream portion at least being retractable axially in the upstream direction with respect to the outer wall from its position for normal flight, and ducting being provided to conduct air from externally of the outer wall of the nozzle to within the annular gas stream leaving the outlet and on the downstream side of the downstream portion of the centre body when so retracted whereby substantial mixing of the gas stream and air progresses from both the internal and external surfaces of the annular gas stream.

With a jet-propulsion nozzle as just set forth, the increased mixing occurs and consequent silencing is obtained only when the downstream portion (or bullet) of the centre body is retracted, and the nozzle may be operated in this way during take-off, low speed climbing and landing of the aircraft. In normal flight the downstream portion or bullet of the centre body is moved from its retracted position to form a nozzle which may be suitable for the production of supersonic jet velocities, as for instance when the outer wall and centre body with the retractable portion in its normal position together form a nozzle as set forth in U.S. Patent No. 2,683,962.

According to a feature of the preferred construction just set forth, the centre body may be supported by hollow struts extending from the outer wall across the exhaust gas passage to the centre body and affording passages for conveying air from externally of the outer wall of the nozzle to the downstream side of the downstream portion (or bullet) of the centre body when it is in its retracted position. The bullet of the centre body may be arranged to act as a valve opening and closing the passages through the hollow struts, the passages being uncovered at their inner ends when the bullet is retracted and covered when the bullet is in its normal flight position. The outer ends of the passages in the hollow struts may open through the outer wall of the nozzle or a jet pipe leading to the nozzle in a portion thereof which in use projects beyond fairing structure enclosing an associated gas generator and main length of the jet pipe. Preferably the centre body comprises a fixed upstream portion supported by the struts and the bullet telescopes with respect to the upstream portion by being retractable into it. In this case the upstream portion of the centre body may have such a length as to extend in use from just downstream of the turbine of an associate gas turbine engine to the nozzle, and an external diameter substantially equal to the internal diameter of the gas passage through the turbine, thereby avoiding the necessity of providing a bullet structure immediately downstream of the turbine and within the jet pipe.

Figure 5:
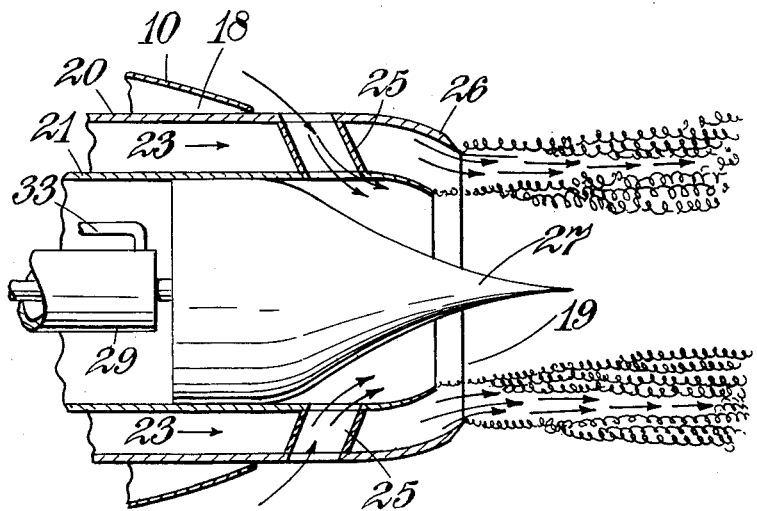
Figure 6:
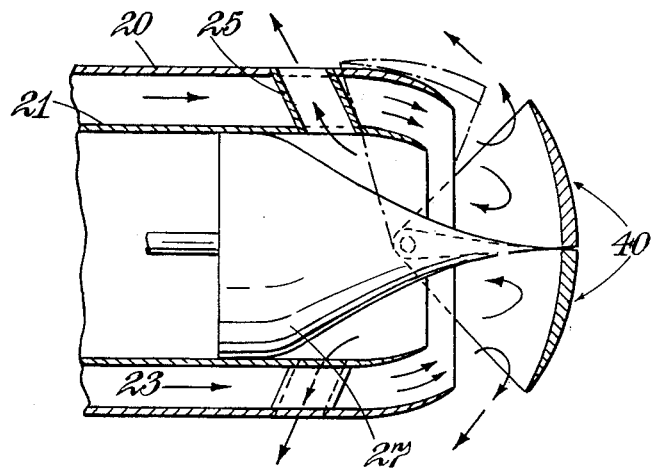
Figure 7:
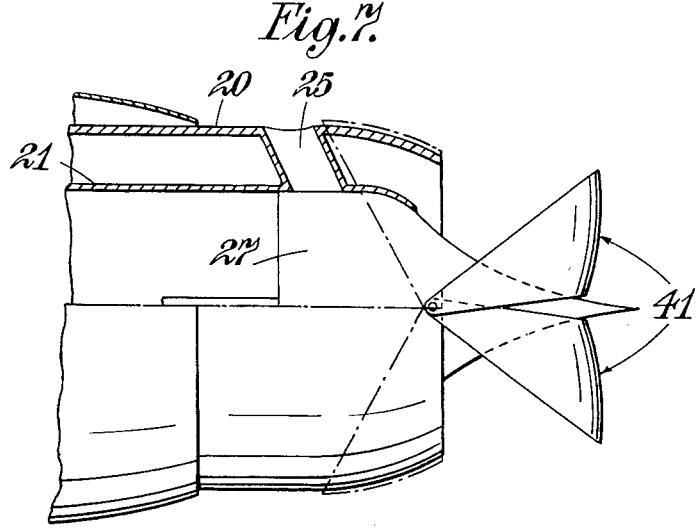

Some constructions of jet-propulsion nozzle of this invention will now be described by way of example, the description making reference to the accompanying drawings in which:

FIGURE 1 illustrates an aircraft for a gas-turbine propulsion engine fitted with a jet-propulsion nozzle of this invention, FIGURE 2 is an axial section through part of the engine and through the jet-propulsion nozzle, with movable parts of the construction shown in one position of operation, FIGURE 3 corresponds to FIGURE 2 with the movable parts in a second position of operation, FIGURE 4 is a section on the line 4—4 of FIGURE 3, FIGURE 5 is a view corresponding to FIGURE 3 with the gas and air flows indicated thereon, FIGURE 6 illustrates one form of nozzle also incorporating thrust reversing means, and FIGURE 7 illustrates another form of nozzle also incorporating thrust reversing means.

Referring to the drawings, there is illustrated in FIGURE 1 a gas-turbine engine within a pod mounting having a fairing 10 enclosing the engine and a strut 11 supporting the fairing 10 and engine below a wing 12 of the aircraft.

The engine comprises a compressor 13 which takes in air from the atmosphere through an air intake 14 at the forward end of the pod fairing 10 and, after compressing the air, delivers it to combustion equipment 15. In the combustion equipment 15, fuel is burnt in the air and the combustion gases are delivered to a turbine 16, the rotor 16a (FIGURE 2) of which is connected by a shaft 17 to drive the compressor rotor. The exhaust gases from the turbine 17 flow into a jet-pipe structure 18 and pass to atmosphere through a jet-propulsion nozzle 19.

Referring now to FIGURES 2 to 4, the jet-pipe structure comprises an outer cylindrical wall 20 which forms an axial extension from the outer casing of the turbine 16, and a centre body having an outer cylindrical wall 21 and an upstream end wall 22 which lies close to the downstream face of the turbine rotor disc 16a. The outer wall 21 of the centre body has a diameter substantially equal to the minimum diameter of the gas passage through the turbine so that the walls 20, 21 of the jet-pipe structure define between them an exhaust gas passage 23 of cylindrical annulus form leading from the outlet of the turbine 16 to the propulsion nozzle 19. The centre body is supported from the outer cylindrical wall of the jet-pipe structure, say by two sets of struts 24, 25, the struts 24 being adjacent the turbine and the struts 25 being adjacent the downstream end of the outer wall 21 of the centre body. The wall 20 has a portion projecting beyond the after end of the fairing 10 and the struts 25 extend across the passage 23 from this portion of the wall.

The jet-nozzle 19 comprises an outer wall 26 formed as an extension of the wall 20 of the jet-pipe structure 18 and a shaped centre body or bullet 27 telescopingly supported by and extending downstream of the wall 21 of the centre body of the jet-pipe structure. The wall 26, the downstream end of the wall 21 and the bullet 27 may be shaped in accordance with Patent No. 668,344 to provide supersonic jet velocity.

The bullet 27 is connected to the piston 28 of a pneumatic ram whereof the cylinder 29 is fixedly supported within the centre body of the jet-pipe structure. Operating air for the ram is tapped off from the compressor 13 of the engine and is conveyed through a conduit 30 to a control valve 31 from which, according to the position of adjustment of the valve 31, the air either passes through a conduit 32 to the upstream end of the ram cylinder 29 or through a conduit 33 to the downstream end of the cylinder 29. An exhaust conduit 34 is connectible to the conduits 32 and 33 under control of the valve 31.

With the ram extended, i.e. when pressure air is supplied to the ram cylinder 29 through the conduit 32 and conduit 33 is connected to the exhaust conduit 34, the bullet 27 is in the position shown in FIGURE 2 in which its external surface forms substantially a smooth continuation of the external surface of the wall 21 and the exhaust gases issue from the nozzle 19 as a supersonic gas jet which is substantially cylindrical downstream of the apex of the bullet 27. With the ram collapsed, i.e. when pressure air is supplied to the ram cylinder 29 through conduit 33 and conduit 32 is connected to the exhaust conduit 34, the bullet 27 is retracted within the centre body 21 so that its portion 27a of maximum diameter is upstream of the inner ends of the struts 25.

The struts 25 are hollow and provide ducts to convey air from externally of the wall 20 to within the wall 21 at a position on the downstream side of the portion 27a of the bullet. It will be clear the bullet thus acts as a valve controlling the air flow through the ducts and that with the bullet 27 in the position shown in FIGURES 3, 4 and 5 air can flow from externally of the jet pipe structure 18 to within the centre of the annular jet issuing from the nozzle 19 between the downstream ends of the wall 21 and the outer wall 26 of the nozzle 19. In this way mixing of atmospheric air with exhaust gases forming the propulsive jet is accelerated since it progresses not only from externally of the jet but also from internally thereof. It is found that in this way substantial silencing of a jet can be obtained, the reduction in intensity being especially marked in the lower frequency range of audible frequencies.

In use, the bullet 27 of the jet-nozzle will be retracted to within the centre body for take-off and landing purposes and where the aircraft is climbing or flying at comparatively low speeds. However, after the aircraft has climbed to a suitable height, the bullet 27 will be moved to its extended position (FIGURE 2) in which the inner ends of the passages through the struts 25 are closed off and the nozzle operated to produce a supersonic gas flow.

The nozzle as above described may be combined with means for producing a reverse thrust for braking purposes (FIGURES 6 and 7) and such means may conveniently comprise clamshell type elements 40 (FIGURE 6) and 41 (FIGURE 7) pivoted on the end of the jet-pipe 20 to swing into an operative position as shown in which the rearward flow of exhaust gas is interrupted and is turned to flow forwardly relative to the direction of flight. If the bullet is in the retracted position of FIGURES 3, 4 and 5, it may be arranged by inclining the struts 25 as shown in FIGURE 6 that when the reverse thrust means 40 is operative exhaust gas may flow in part outwardly and forwardly through the passages formed in the hollow struts 25 to produce the braking thrust.

The invention may also be employed in a jet propulsion nozzle for a by-pass gas turbine engine. In such a nozzle, the by-pass duct normally surrounds the exhaust gas duct and extends to the plane of the exhaust nozzle. In such a nozzle, the struts 25 would be extended outwards across the by-pass duct.

I claim:

1. A jet propulsion nozzle comprising an outer wall and a center body within the outer wall, the center body having a downstream portion projecting beyond the downstream end of the outer wall, whereby an annular outlet is formed between the outer wall and the center body, the downstream portion of the center body being shaped to reduce the aerodynamic drag of the nozzle and the downstream portion being retractable axially in the upstream direction with respect to the outer wall from its position for normal flight, ducting being provided to conduct air from externally of the outer wall of the nozzle to within the annular gas stream leaving the outlet end on the downstream side of the downstream portion of the center body when so retracted whereby substantial mixing of the gas stream and air progresses from both the internal and external surfaces of the annular gas stream, and valve means responsive to the position of the said downstream portion for allowing flow of external air through said ducting to within the annular gas stream when the said downstream portion is retracted and for preventing such flow when in its position for normal flight.

2. A jet propulsion nozzle comprising an outer wall and a centre body within the outer wall, the center body having a downstream portion projecting beyond the downstream end of the outer wall, whereby an annular outlet is formed between the outer wall and the centre body, the downstream portion of the centre body being shaped to reduce the aerodynamic drag of the nozzle and the downstream portion being retractable axially in the upstream direction with respect to the outer wall from its position for normal flight, and ducting being provided to conduct air from externally of the outer wall of the nozzle to within the annular gas stream leaving the outlet and on the downstream side of the downstream portion of the centre body when so retracted whereby substantial mixing of the gas stream and air progresses from both the internal and external surfaces of the annular gas stream, the retractable portion closing the ducting when in its position for normal flight.

3. A jet propulsion nozzle according to claim 2, said ducting comprising hollow struts extending from the outer wall across the exhaust gas passage to the centre body and supporting the center body, said hollow struts having internal passages for conveying air from externally of the outer wall of the nozzle to the downstream side of the downstream portion of the centre body when it is in its retracted position.

4. A jet propulsion nozzle according to claim 3, wherein the outer ends of the passages in the hollow struts open through the outer wall in a portion thereof which in use projects beyond fairing structure enclosing an associated gas generator and main length of the jet pipe.

5. A jet propulsion nozzle according to claim 3, wherein the centre body comprises a fixed upstream portion supported by the struts and the downstream portion telescopes with respect to the upstream portion by being retractable into it.

6. In combination, a jet propulsion nozzle according to claim 5 and a turbine having a gas exhausting to the nozzle, wherein the upstream portion of the centre body has such a length as to extend in use from just downstream of the turbine to the nozzle and has an external diameter substantially equal to the internal diameter of the gas passage of the turbine.

7. A jet propulsion nozzle comprising an outer wall, a center body within the outer wall and forming with the outer wall a gas passage with an annular outlet for the nozzle, the center body having a downstream portion projecting beyond the downstream end of the outer wall and being shaped to reduce the aerodynamic drag of the nozzle, the downstream portion being movable between a rearwardly-projecting position for normal flight and a retracted position in which the downstream portion is retracted axially in the upstream direction from the rearwardly projecting position, and a plurality of hollow struts extending from the outer wall across the gas passage to the center body and supporting the center body, the hollow struts having internal passages conveying air from externally of the outer wall to the downstream side of the downstream portion when it is in its retracted position, said downstream portion covering the inner ends of the internal passages when in the rearwardly-projecting position and uncovering the inner ends of the passages when retracted thereby to act as a valve controlling flow of air through the passages.

8. A jet propulsion nozzle comprising an outer wall, a center body within the outer wall and forming with the outer wall a gas passage with an annular outlet for the nozzle, the center body having a downstream portion projecting beyond the downstream end of the outer wall and being shaped to reduce the aerodynamic drag of the nozzle, the downstream portion being movable between a rearwardly projecting position for normal flight and a retracted position in which the downstream portion is retracted axially in the upstream direction from the rearwardly-projecting position, and a plurality of hollow struts extending from the outer wall across the gas passage to the center body and supporting the center body, the hollow struts having internal passages conveying air from externally of the outer wall to the downstream side of the downstream portion when it is in its retracted position, said downstream portion covering the inner ends of the internal passages when in the rearwardly-projecting position and uncovering the inner ends of the passages when retracted thereby to act as a valve controlling flow of air through the passages, said internal passages having an inclination in the forward flight direction from their inner ends to their outer ends, and thrust-reversing elements pivoted on the nozzle to swing between an inoperative position and a thrust-reversing position in which they interrupt the rearward flow of exhaust gas and cause part at least of the exhaust gas to flow outwardly and forwardly through the internal passages in the struts, said downstream portion being in the retracted position when the said elements are in the thrust-reversing position.

References Cited in the file of this patent

UNITED STATES PATENTS

| | | |
|---|---|---|
| 1,439,506 | Dürr | Dec. 19, 1922 |
| 2,293,632 | Sauer | Aug. 18, 1942 |
| 2,483,401 | Cole | Oct. 4, 1949 |
| 2,619,821 | Fink | Dec. 2, 1952 |
| 2,671,620 | Andrews | Mar. 9, 1954 |
| 2,735,254 | Jewett | Feb. 21, 1956 |
| 2,865,169 | Hausmann | Dec. 23, 1958 |

FOREIGN PATENTS

| | | |
|---|---|---|
| 733,727 | Great Britain | July 20, 1955 |